Sept. 22, 1970 H. E. SHEFFIELD, JR 3,530,460

DIGITAL TO ANALOG CONVERTER HAVING DUAL POLARITY SWITCHING MEANS AND WEIGHTED RESISTOR LADDER

Filed Aug. 18, 1966 5 Sheets-Sheet 1

FIGURE I

HERMAN E. SHEFFIELD, JR
INVENTOR.

BY Russell E. Schlorff
ATTORNEY

HERMAN E. SHEFFIELD, JR.
INVENTOR.
BY Russell E. Schlorff
ATTORNEY

HERMAN E. SHEFFIELD, JR
INVENTOR.

BY Russell E. Schlorff
ATTORNEY

HERMAN E. SHEFFIELD, JR.
INVENTOR.
BY Russell E. Schlorff
ATTORNEY

HERMAN E. SHEFFIELD, JR.
INVENTOR.

BY Russell E. Schlorff
ATTORNEY

United States Patent Office 3,530,460

Patented Sept. 22, 1970

3,530,460

DIGITAL TO ANALOG CONVERTER HAVING DUAL POLARITY SWITCHING MEANS AND WEIGHTED RESISTOR LADDER

Herman E. Sheffield, Jr., Houston, Tex., assignor to Dresser Industries, Inc., Dallas, Tex., a corporation of Delaware Filed Aug. 18, 1966, Ser. No. 573,266
Int. Cl. H03k 13/04
U.S. Cl. 340—347 1 Claim

ABSTRACT OF THE DISCLOSURE

A bit and sign holding register having 13 input bits and 1 sign bit is connected through a similar number of dual polarity switching circuits into a weighted resistor ladder add eventually into an operational amplifier. The noninverting input of the operational amplifier is grounded whereas the inverting input, near ground, is connected to the summing junction of the resistor ladder, thus allowing the output of the amplifier to swing at minus one volt per milliamp of inverting input current and directly relate to the value of the particular weighted resistors.

This invention relates to the conversion of digital data to an analog voltage. More particularly, it relates to an improved method and system for generating bipolar analog voltages suitable for analog display from wide range digital data.

The prior art has included varied methods and apparatus for displaying digital data in analog form, such as, for example, an analog voltage. However, these methods and apparatus have involved rather complex and expensive electrical and mechanical equipment. The complexity of the prior art apparatus has also generally resulted in a need for the equipment to receive either extensive factory or field adjustments. Furthermore, the conventional digital-to-analog converters quite often have used components which cause the whole system to drift, thus requiring further adjustments or environmental and control compensation features.

It is therefore a primary object of the invention to provide an improved digital to analog converter;

It is another object of the invention to provide an improved method for converting digital data to an analog voltage;

It is yet another object of the invention to provide a digital to analog converter requiring substantially no service adjustments; and It is a further object of the invention to provide a digital to analog converter requiring a minimal amount of environmental control.

The objects of the invention are accomplished, broadly, by circuitry which connects a parallel group of adding resistors to an operational amplifier of conventional design in such a manner that either (+) 10 volts, (−) 10 volts or zero (open) is switched through the respective adding resistors by the digital bits, the resistors being weighted according to powers of 2, such as $K \times 2^1$, $K \times 2^2$ . . . $K \times 2^n$. The noninverting input of the operational amplifier is grounded, while the inverting input remains essentially at ground. The output of the amplifier so connected swings at (−) 1 volt per milliamp of inverting input current, the input current being merely a function of the adder resistors and the voltages thereupon since the inverting input is essentially at ground. Switching circuitry connects each input bit to one or more of the adding resistors, thereby providing digital to analog conversion.

These and other objects, features and advantages of the present invention will be apparent from the following detailed description, taken with reference to the figures of the accompanying drawings, wherein the same or similar reference characters illustrate the same or similar parts:

Figure 1:
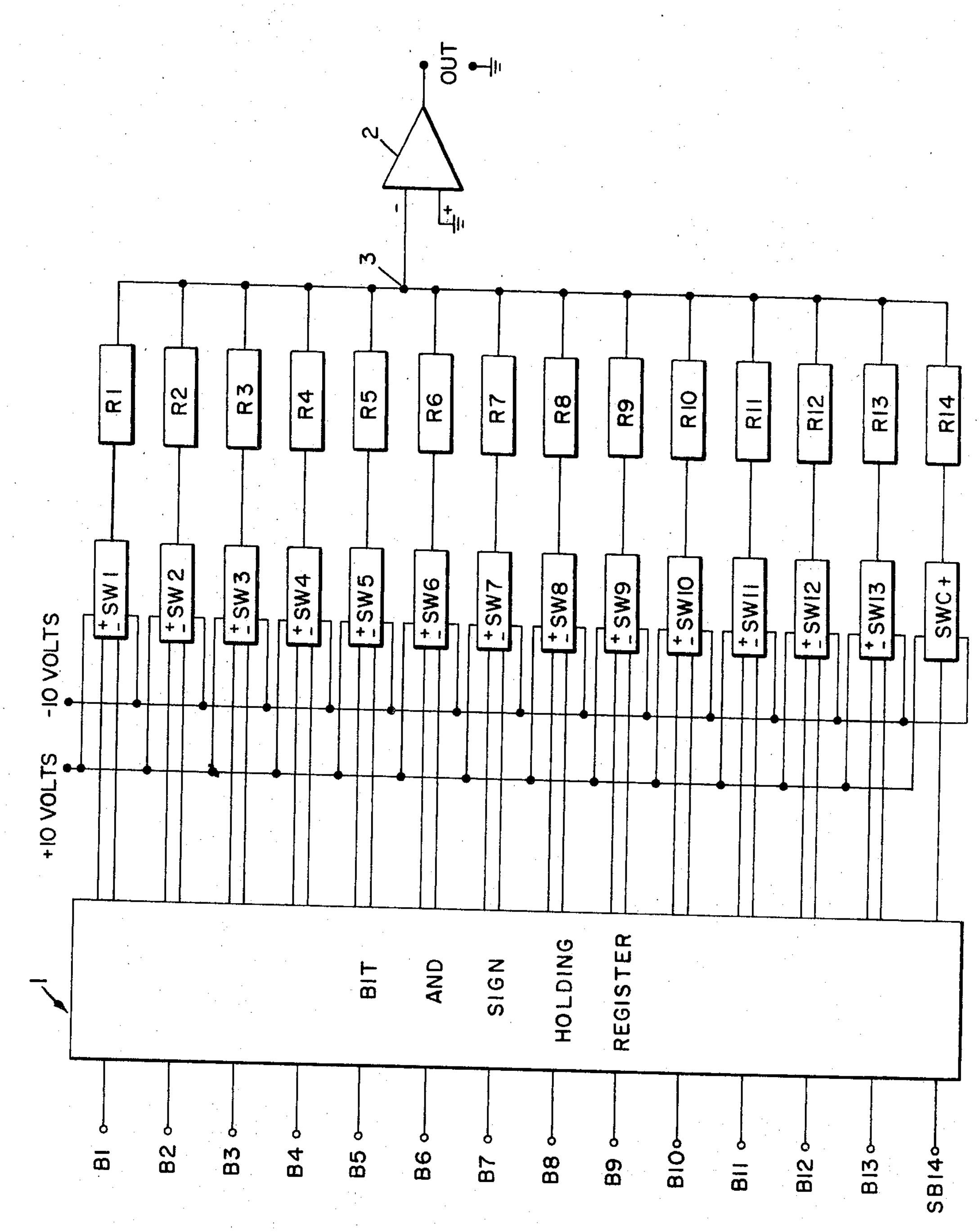
FIG. 1 illustrates a block diagram of a digital to analog converter according to the invention.

In the form of the present invention chosen for purposes of illustration in the drawings, FIG. 1 shows a block diagram of the digital to analog converter according to one embodiment of the invention. The bit and sign holding register 1, having thirteen input bits numbered B1 through B13 and a sign bit SB14, is connected into thirteen switching boxes numbered SW1 through SW13, which are in turn connected into the adder resistor ladder. The individual resistors in the ladder are numbered R1 through R13. A 2's complement switching circuit SWC+ is also provided, along with its weighted resistor R14. The adder resistors are commonly connected to a junction 3, the current through which is connected into the inverting input of operational amplifier 2. The operational amplifier, being of conventional design, is connected in the inverted configuration with its noninverting input grounded. The inverting input thus will remain essentially at ground and the output of the amplifier 2 will swing at minus 1 volt per milliamp of current into the inverting input. Since the inverting input remains essentially at ground, the current in is a function only of the adding resistors and the voltage on these resistors. The currents through the adding resistors add linearly. As an example, plus 10 volts on a 2K ohm resistor will produce 5 milliamps in; plus 10 volts on a 4K ohm resistor will produce 2.5 milliamps in; plus 10 volts on both the 2K-ohm resistor and the 4K-ohm resistor will produce 7.5 milliamps input to the amplifier, with a 7.5-volt output.

Figure 2:
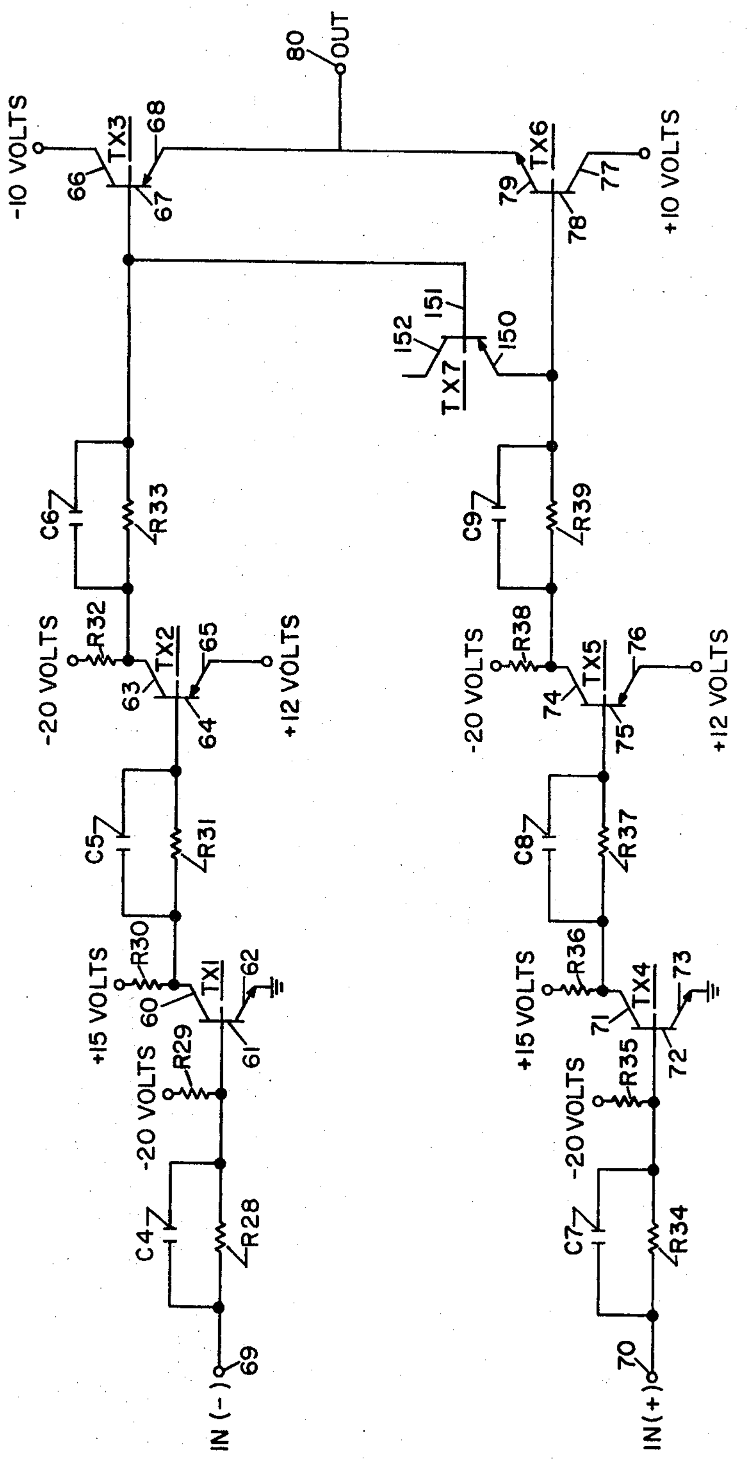
FIG. 2 is a schematic drawing of one of the switches according to FIG. 1.

FIG. 2 illustrates one of the switches of FIG. 1 in detail, for example, SW1. The negative input terminal 69 is connected to resistor R28 and its parallel pulse-shaping capacitor C4, which together lead into the base 61 of transistor TX1 with its collector 60 and emitter 62, the emitter being grounded. Resistor R29, also connected to base 61, is connected to a negative 20-volt power supply. Resistor R30, being connected to collector 60, is also connected to a positive 15-volt power supply. The collector 60 is also connected to resistor R31, which is connected in parallel with pulse-shaping capacitor C5, which in turn drives the base 64 of transistor TX2, transistor TX2 also having a collector 63 and an emitter 65. The emitter 65 is connected to a positive 12-volt power supply. The collector 63 is connected to a negative 20-volt power supply through resistor R32. The collector 63 is also connected to resistor R33, which is connected in parallel with pulse-shaping capacitor C6, which in turn drives the base 67 of transistor TX3. Transistor TX3 also has a collector 66 and an emitter 68. The collector 66 is connected to a negative 10-volt power supply, while the emitter 68 is connected to the output terminal 80. The positive input terminal 70 is connected through resistor R34 and a parallel pulse-shaping capacitor C7 into a base 72 of transistor TX4, the emitter 73 of which is grounded. The base 72 of transistor TX4 is connected through resistor R35 to a negative 20-volt power supply. The collector 71 is connected through resistor R36 to a positive 15-volt power supply. The collector 71 is also connected through resistor R37 and its parallel pulse-shaping capacitor C8 to the base 75 of transistor TX5, the emitter 76 of which is connected to a positive 12-volt power supply. The collector 74 is connected through resistor R38 into a negative 20-volt power supply. The collector 74 is connected through resistor R39 and its parallel pulse-shaping capacitor C9 into the base 78 of transistor TX6, the collector 77 of which is connected to a positive 10-volt power supply. The emitter 79 of transistor TX6 is connected to the output terminal 80. The base connection 78 of transistor TX6 is also connected to the emitter 150 of transistor TX7. The collector 152 of transistor TX7 is not connected in the circuitry. The base 151 is connected to the base 67 of transistor TX3.

As will be described in detail hereinafter, the only voltages which are available at terminals 69 and 70 are 0 volt and +2.5 volts. The switch inputs as compared with switch outputs are as follows:

| In | | Out |
|---|---|---|
| Terminal 69(−) | Terminal 70(+) | Terminal 80. |
| +2.5 v. | +2.5 v. | +10 v. |
| 0 v. | 0 v. | −10 v. |
| +2.5 v. | 0 v. | Open. |

In the operation of the switch, it should be appreciated that +2.5 volts at input terminal 69 is switched through transistors TX1 and TX2 to turn off transistor TX3. Conversely, 0 volt at input 69 leaves TX3 in an on condition. When TX3 is on, the output at terminal 80 is −10 volts less the slight voltage drop across TX3. +2.5 volts at input 70 is switched through transistors TX4 and TX5 to turn on transistor TX6, thus resulting in −10 volts on output terminal 80. For ease of illustration, the slight voltage drop across either TX3 or TX6 is not considered in the current computations, but would be a factor in the actual practice of this invention. As shown in FIG. 1, each of the switches SW1–SW13 is connected to its corresponding adder resistor R1–R13, respectively, as well as switch SWC+ being connected to resistor R14. In the example, output terminal 80 of SW1 is connected to the terminal marked SW1 in FIG. 3.

Figure 3:
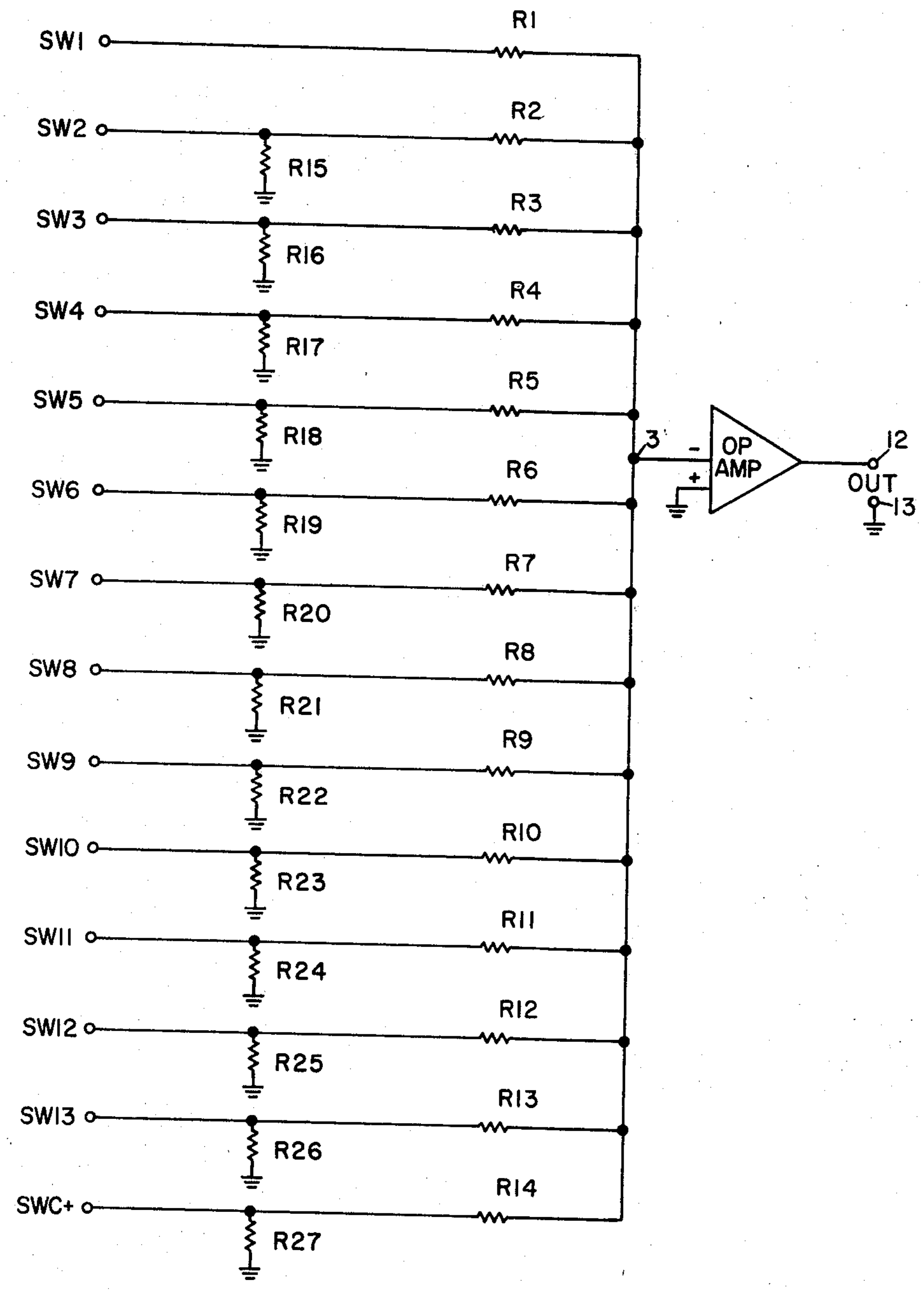
FIG. 3 is a detailed schematic drawing of a ladder of adding resistors which are switched by the switches according to FIGS. 1 and 2.

FIG. 3 illustrates a resistor ladder, the individual resistors of which are connected to the respective switches SW1 through SW13 and SWC+. It should be appreciated that while there are 13 input bits, 13 switches, and 13 adder resistors, these numbers are merely exemplary of the number of bits which are useful with the invention. In the resistor ladder the individual resistors for each line are a factor of 1K ohm$\times 2^n$. Thus, resistor R1 is 2K ohm, resistor R2 is 4K ohm, resistor R3 is 8K ohm, resistor R4 is 16K ohm, etc. The components of FIG. 3, as well as the other resistor, capacitor and transistor components in the drawings are listed in Table One, Table Two and Table Three. One end of each of the resistors R2 through R14 is connected, respectively, to a 2K-ohm resistor, being R15 through R27, each of the resistors R15 through R27 also being grounded. The other ends of resistors R2 through R14 are connected to a common junction 3, which is connected to the inverting input of the operational amplifier 2, the amplifier being shown in more detail in FIG. 4.

Figure 4:
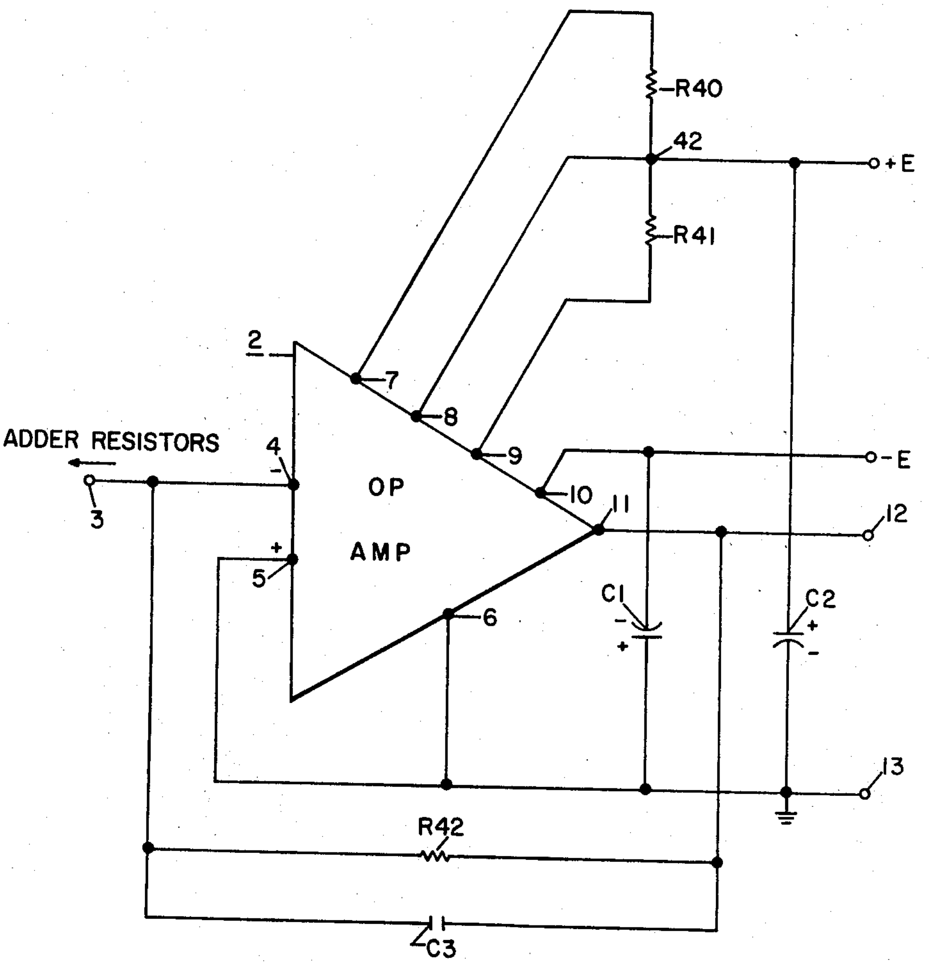
FIG. 4 is a detailed representation of the circuit connections for the operational amplifier according to FIG. 1.

FIG. 4 illustrates the connections for the conventional operational amplifier 2. The currents through the adder resistors, passing through junction 3, are fed into the negative or inverting input terminal 4. The positive, or noninverting, input terminal 5 is grounded, as is terminal 6 of the operational amplifier 2. Resistor R42 and its parallel capacitor C3 are connected between input terminal 4 and output terminal 11. The output from the amplifier 2 is taken between terminal 12, being connected directy to terminal 11, and terminal 13 which is grounded. The positive power supply, shown as +E is connected through junction 42 to terminal 8 of the amplifier. The trim terminals 7 and 9 are connected through resistors R40 and R41, respectively, to junction 42. Terminal 10 of the amplifier is connected to the negative power supply, illustrated as −E. The capacitors C1 and C2 are connected to ground from terminal 42 and terminal 12, respectively.

In the operation of the conventional amplifier 2, because of the particular resistance values used therein, the voltage output between terminals 12 and 13 is −1 volt per milliampere of current through the adder resistors. The +10 volts generates current in, the −10 volts generates current out, and the open state of the switches produces no current. If the sign bit SB14 of FIG. 1 indicates a positive value, the switch outputs go to either −10 volts or open, depending upon the individual digital information pulses on bits B1–B13. Thus, for example, a positive "1" bit pulse drives the respective switch to −10 volts, which produces a positive output from the operational amplifier 2. A "0" bit pulse drives the respective switch to "open," resulting in no output from the amplifier 2.

Figure 5:
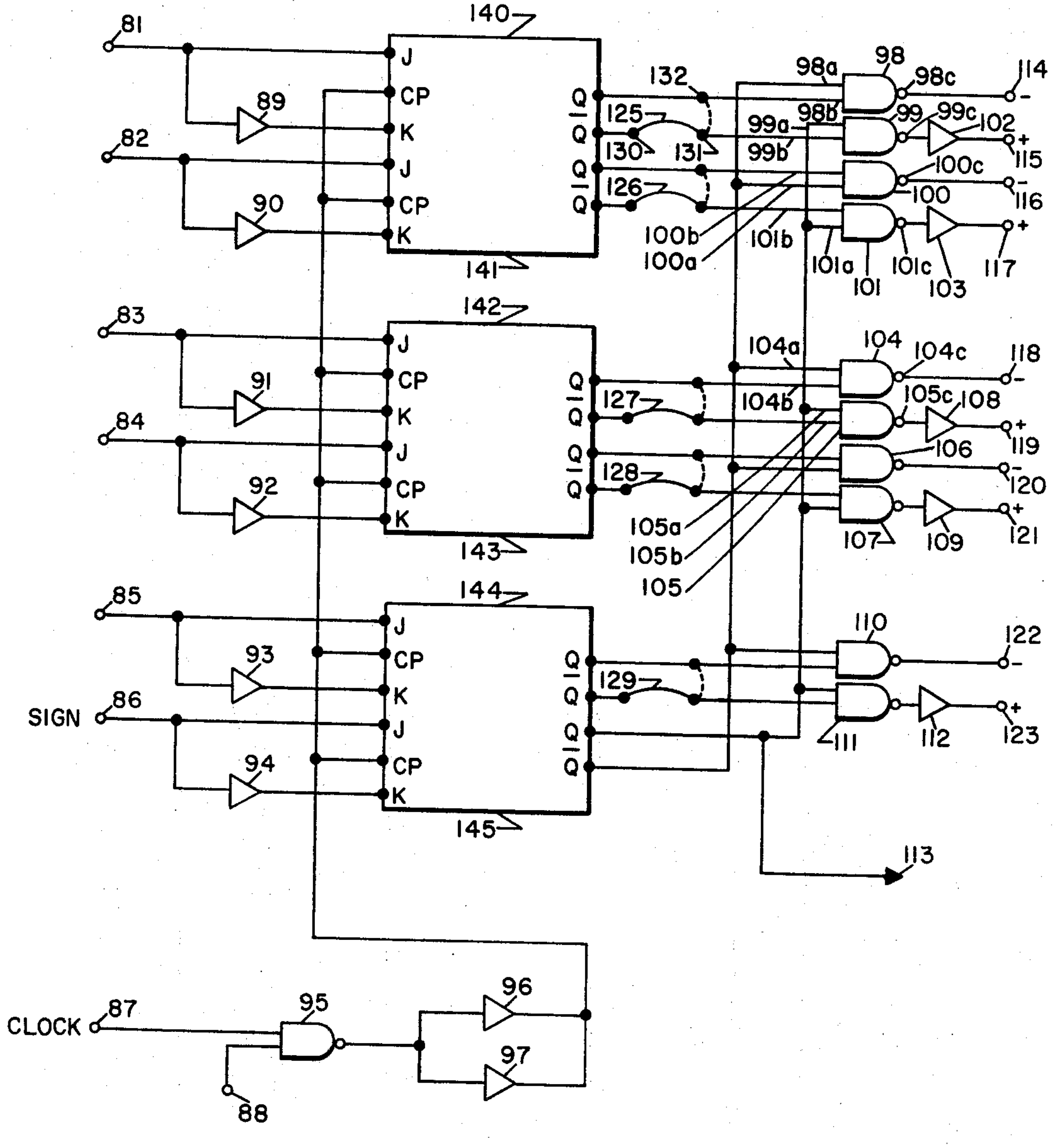
FIG. 5 is a block diagram of a register and gating card for driving the switching circuitry as illustrated in FIG. 2.

FIG. 5 illustrates in detail the Bit and Sign Holding Register of FIG. 1. While there are only five conventional bistable multivibrator circuits 140–144 and one conventional sign holding bistable multivibrator 145 illustrated, it should be appreciated that there is one such circuit as 140 for each input bit. Such an arrangement as shown in FIG. 5 is commercially available from the semiconductor industry in integrated circuit form and should they be so used, there would be required three such integrated circuits for a thirteen bit plus sign bit converter for this particular embodiment of the invention.

Digital information, for example, an electrical pulse such as a square wave, is supplied to the terminals 81 through 85, as well as terminal 86 for the sign pulse. For purposes of illustration, assume a positive "1" pulse is applied to terminal 81, which is connected to the "J" input of the circuit 140. Assume further that this is a straight binary system and that the bus wire 125 is connected along the dotted path between terminals 131 and 132 while being removed from terminal 130. The positive "1" pulse drives the "Q" output of circuit 140 to the high voltage level, which in turn is fed into the conventional "Nand" gates 98 and 99. For this illustration, each of the "Nand" gates 98 through 111 are such that there is a low level output voltage on gate 98, for example, at terminal 98c only when there is a high level voltage input at both terminal 98a and at terminal 98b. In conventional symbology, this can be written as $98a \cdot 98b = \overline{98c}$.

These particular logic configurations require that the positive sign pulse at terminal 86 is a 0 voltage input while a negative sign pulse is represented as a positive going square wave pulse. Each of the multivibrator circuits 140 through 145 are biased such that with no input at either terminals "J" or "K," the "Q" output is at a low voltage level and the "$\overline{Q}$" output is at a high voltage level. Thus, a positive sign or zero volt input at terminal 86 will not change the states of the sign circuit 145, whereas a negative input to terminal 86, being a given voltage level above zero, will cause the "Q" output of circuit 145 to change to a higher voltage level output and the "$\overline{Q}$" output of circuit 145 to be a low voltage level. Conversely, a "1" signal at any of the terminals 81 through 84 will cause the "Q" outputs to go to a high voltage level, whereas the "$\overline{Q}$" outputs will go to a low voltage level. Terminals 81 through 86 are connected directly to the "J" terminals of circuits 140 through 145, respectively, whereas terminals 81 through 86 are connected through the conventional inverter circuits 89 through 94 to the "K" input terminals of circuits 140–145.

Assume a binary "1" pulse is applied to terminal 81 and that it is part of a positive number. Thus, a positive going signal is applied to terminal 81 and a zero pulse is applied to terminal 86. As explained heretofore the "Q" output of circuit 140 goes to a high voltage level and is connected to terminal 98*b* of gate 98. The "$\overline{Q}$" output of circuit 145 is at a high voltage level and is connected to terminal 98*a* of gate 98. Thus, the output at terminals 98*c* and 114 is 0 volt because the conditions for the equation $98a \cdot 98b = \overline{98c}$ are satisfied. The input to gate 99*b* of gate 99 is at a high voltage level whereas the input at 99*a* is at a low voltage level, the "Q" output from circuit 145 being at a low level. Thus the output at terminal 99*c* is at a high voltage level. The output from terminal 99*c* is passed through the conventional inverter circuit 102, resulting in a 0 voltage ouput at output terminal 115. In summary, a "1" pulse at terminal 81 produces a 0-volt output at terminals 114 and 115. As described heretofore with regard to the switches of FIG. 2, 0 volt at both of the terminals 69 and 70 produce a minus 10 volts at terminal 80. Terminals 114 and 115 of FIG. 5 are connected to terminals 69 and 70 of FIG. 2, respectively. Assume now that a "0" pulse, being in the form of a 0 voltage bit digital information, is supplied to terminal 82. This low level signal will not cause the circuit 141 to change states. Thus the output from the "Q" output terminal of circuit 141 is at a low level, which is fed into terminals 100*b* and 101*b* of gates 100 and 101, respectively. The "$\overline{Q}$" output from circuit 145 is at a high voltage level, which is connected to terminal 100*a* of gate 100. The output at 100*c* and terminal 116 is therefore at a high voltage level, approximately +2.5 volts, since the equation $100a \cdot 100b = \overline{100c}$ is not satisfied. The "Q" output of circuit 145 is connected to input terminal 101*a* of gate 101. Thus, the output at terminal 101*c* is at +2.5 volts since the equation $101a \cdot 101b = \overline{101c}$ is not satisfied. The +2.5-volt signal is passed through the conventional inverter circuit 103 to result in a 0-volt output at terminal 117. In summary, a "0" information pulse at terminal 82 produces a +2.5-volt output at terminal 116 and a 0-volt output at terminal 117.

Assume now, that there is a minus digital number which is being fed into the input to the circuitry of FIG. 5. The input pulse to terminal 83 will nonetheless be a positive going signal which is connected to input terminal "J" of circuit 142. The "Q" output terminal of circuit 142 is connected to terminal 104*b* of gate 104 atnd terminal 105*b* of gate 105. The "$\overline{Q}$" output of circuit 145 is connected to terminal 104*a*, whereas the "Q" output is connected to terminal 105*a* of gate 105. Since the number which is being applied is a negative number, the input pulse to terminal 86 is a positive going pulse, which causes the "Q" output of circuit 145 to be at a high voltage level and the "$\overline{Q}$" output to be at a low voltage level. Thus, the output at terminal 104*c* and 118 is a +2.5 volts since the equation $104a \cdot 104b = \overline{104c}$ is not satisfied. The output at terminal 105*c* is equal to 0 volt, since the equation $105a \cdot 105b = \overline{105c}$ is satisfied. The 0-volt output from terminal 105*c* is fed through the conventional inverter circuit 108 to produce a +2.5 volts output at terminal 119. In summary, a "1" digital bit which is part of a negative number causes a +2.5-volt output to appear at both terminals 118 and 119.

A conventional set of clock pulses is applied to input terminal 87 through the "Nand" gate 95 while a B+ power supply (not illustrated) is connected to terminal 88 of gate 95. The output from gate 95 is connected through a pair of parallel inverter stages 96 and 97 to the clock pulse inputs designated CP on each of the circuits 140–145.

If the digital system is 1's or 2's complement instead of straight binary, the bus wires 125, 126, 127, 128 and 129 are connected between the "$\overline{Q}$" outputs of circuits 140–145 to the gates 99, 101, 105, 107 and 111, respectively. The line 113 is connected to the "Q" output of the circuit 45 into the 2's complement switch SWC+, whereby the output of SWC+ is +10 volts whenever a negative number is indicated.

Since the complementary logic uses the same circuits for 1's and 2's complement as heretofore described, no further description of "1" or "0" information fed into terminals 81 through 85 is deemed necessary. 1's and 2's complement logic is well-known in the art, for example, as is set forth in Digital Computer Principles, McGraw-Hill Book Co., 1962, pages 49–51. Suffice it to say, that a "1" bit of information on one of the input terminals 81 through 85 will produce 0 volt on each of its corresponding output terminals, for example, terminals 114 and 115, whereas a "0" bit of inforcation at one of terminals 81 through 85 will produce +2.5 volts and zero volt on its output terminals, for example, terminals 116 and 117.

Thus it has been illustrated and described how a positive binary number will cause a minus 10 volts to be swung through one or more of the resistors in the resistor ladder of FIG. 3 and a negative binary number will cause a plus 10 volts to be switched through one or more of the resistors of the same resistor ladder. Likewise, a zero bit of information in either the plus or minus binary number will cause an open circuit in the particular resistor to which it is connected. It has therefore been explained and described with regard to the drawings how digital information is converted into a bipolar analog voltage.

The digital-to-analog converter system thus described produces an error which is essentially constant as a percentage of the output. If the output is a nominal +5 volts, the output will be within ±1% of 5 volts. If the nominal output is 40 mv., the output is within ±1% of 40 mv., except for the offset voltage which is discussed hereinafter. This type of accuracy is normally within the allowable when displaying visual analog data. It should be appreciated that in conventional digital-to-analog converters a constant absolute accuracy is maintained.

The output voltage offset is determined by the characteristics of the operational amplifier, normally being within the order of 5 to 10 mv.

The system thus described is especially suited to the analog playback of digital seismic data wherein the converter output voltage is processed by AGC circuitry. When the converter output voltage is high in magnitude, the bits of small significance do not appear to the human eye since the human eye can distinguish only a small dynamic range. When the converter output voltage is low in magnitude, only the bits of small significance are operative. When the low output voltage is increased to the level required by the display device the display continues to have more accuracy than can be distinguished by the human observer, and thus the system according to the present invention is within most commercial accuracy requirements.

Because most conventional bipolar digital-to-analog converters switch bits of high significance when the output voltage magnitude is small, high accuracy is required on the conventional bits. Contrarywise, the present invention allows bits of high significance to be generated to the same relative accuracy as the bits of low significance since the bits of high significance are operative only when the output voltage magnitude is high.

Because of the reduced accuracy requirements of the bits of high significance, the digital-to-analog converter according to the present invention requires no ovens or other expensive components, and no field or factory adjustments, some or all of which are used on conventional digital-to-analog converters.

The embodiments above described have been with respect to a positive logic and a certain pattern for the respective logic circuits. However, it will be apparent that other arrangements are possible without departing from the spirit and scope of the invention. Other variations of the components of the basic system will be apparent to those skilled in the arts.

TABLE ONE

| Theoretical | Practical |
|---|---|
| R1—2kohm | 2,000 ohm*. |
| R2—4k | 4,020 ohm*, parallel with 820k. |
| R3—8k | 8.06K*, parallel with 1M. |
| R4—16k | 16.2K*, parallel with 1.2M. |
| R5—32k | 32.4K, parallel with 2.7 M. |
| R6—64k | 63.4K*, series with 600 ohm. |
| R7—128k | 127K*, series with 1k. |
| R8—256k | 255K*, series with 1k. |
| R9—512k | 511 K*. |
| R10—1.024Mohm | 1M*, series with 24k. |
| R11—2.048M | 2M*, series wtih 47k. |
| R12—4.096M | 3.92M*, series wtih 174K*. |
| R13—8.192M | 3.92M*, series with 3.92M*, series with 348K*. |
| R14—8.192M | 3.92M*, series with 3.92M*, series with 348K*. |
| R15—4kohm | |
| R16—2k | |
| R17—2k | |
| R18—2k | |
| R19—2k | |
| R20—2k | |
| R21—2k | |
| R22—2k | |
| R23—2k | |
| R24—2k | |
| R25—2k | |
| R26—2k | |
| R27—2k | |
| R28—5.1k | |
| R29—82k | |
| R30—8.2k | |
| R31—12k | |
| R32—8k | |
| R33—2k | |
| R34—5.1k | |
| R35—82k | |
| R36—8.2k | |
| R37—12k | |
| R38—8k | |
| R39—2k | |
| R40—51k | |
| R41—51k | |
| R42—1k, 1% metal film | |

*1% metal film, others are 5% composition carbon.

TABLE TWO

C1—10$\mu$f., 25 volts, electrolytic
C2—10$\mu$f., 25 volts, electrolytic
C3—50 pf.
C4—200 pf.
C5—200 pf.
C6—200 pf.
C7—200 pf.
C8—200 pf.
C9—200 pf.

TABLE THREE

Transistors

TX1—2N1304
TX2—2N404A
TX3—2N1305
TX4—2N1304
TX5—2N404A
TX6—2N1304
TX7—2N404A

What is claimed is:

1. A system for converting digital data to an analog voltage form comprising:

(a) a plurality of input terminals for said digital data, said input terminals including at least one sign bit terminal, whereby a signal can be applied to said sign bit terminal indicative of the polarity of said digital data;

(b) registration means connected to said input terminals;

(c) a weighted resistor ladder having a common terminal connected to one end of each of the resistors in said ladder;

(d) an operational amplifier connected to said common terminal;

(e) a plurality of switching means connected between said registration means and the other end of each of said resistors, whereby voltages can be switched through said resistors to said amplifier to provide an analog voltage indicative of said digital data; and (f) means for converting said system from a straight binary digital data system to a digital complement data system.

References Cited

UNITED STATES PATENTS 3,184,734 5/1965 Uren et al. ---------- 340—347
3,403,393 9/1968 Skrenes ------------ 340—347

MAYNARD R. WILBUR, Primary Examiner

M. K. WOLENSKY, Assistant Examiner